(12) United States Patent
Dalal et al.

(10) Patent No.: US 6,363,404 B1
(45) Date of Patent: Mar. 26, 2002

(54) THREE-DIMENSIONAL MODELS WITH MARKUP DOCUMENTS AS TEXTURE

(75) Inventors: Ketan K. Dalal, Seattle; Anthony L. Willie, Kirkland; Colin D. McCartney, Kirkland; Robert M. Heddle, Kirkland, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/105,831

(22) Filed: Jun. 26, 1998

(51) Int. Cl.$^7$ .............................................. G06F 17/20

(52) U.S. Cl. ..................... 707/513; 345/582; 345/760; 345/848

(58) Field of Search ................................. 707/513, 501, 707/517, 520, 501.1; 345/418, 419, 430, 582, 760, 782, 848

(56) References Cited

U.S. PATENT DOCUMENTS

| | | | | |
|---|---|---|---|---|
| 4,912,669 A | * | 3/1990 | Iwamoto et al. | 707/531 |
| 5,640,193 A | * | 6/1997 | Wellner | 348/7 |
| 5,838,906 A | * | 11/1998 | Doyle et al. | 709/202 |
| 5,918,237 A | * | 6/1999 | Montalbano | 707/513 |
| 5,983,244 A | * | 11/1999 | Nation | 707/501 |
| 6,018,748 A | * | 1/2000 | Smith | 707/501 |
| 6,029,200 A | * | 2/2000 | Beckerman et al. | 709/226 |
| 6,031,536 A | * | 2/2000 | Kamiwada et al. | 345/355 |
| 6,032,150 A | * | 2/2000 | Nguyen | 707/102 |
| 6,032,157 A | * | 2/2000 | Tamano et al. | 707/104 |
| 6,034,689 A | * | 3/2000 | White et al. | 345/357 |
| 6,035,323 A | * | 3/2000 | Narayen et al. | 709/201 |
| 6,070,176 A | * | 5/2000 | Downs et al. | 707/513 |

OTHER PUBLICATIONS

Andrews, Keith, et al, "Hyper–G and Harmony: Towards the Next Generation of Networked Information Technology", ACM 0–89791–755–3/95/0005, pp. 33–34, Dec. 1995.*

Elvins, T. Todd, et al, "Web–based Volumetric Data Retrieval", ACM 0–89791–818–5/95/12, pp. 7–12, Dec. 1995.*

Flanagan, David, Java Examples in a Nutshell, O'Reilly, pp. 185–187, Sep. 1997.*

Hartman, Jed, et al, The VRML 2.0 Handbook, Addison–Wesley Publishing Co., plates 1–2, 21–22, 25–29, 32–35, pp. 2–3, 7–9, 28, 62–65, 89–90, 119–136, 160–168, 187–211, 213–220, Oct. 1997.*

Isaacs, Scott, Inside Dynamic HTML<Microsoft Press, pp. 57–63, 66–67, 69–74, 79, Dec. 1997.*

Meyer, Tom, et al, "WAXweb: Toward Dynamic MOO–based VRML", ACM 0–89791–818–5/95/12, pp. 105–108, Dec. 1995.*

Oliver, Dick, et al, Netscape 3 Unleashed, second edition, Sams.net Publishing, pp. 314–315, 365–369, 386–388, 394–396, 518–520, 839, 842–844, Dec. 1996.*

(List continued on next page.)

*Primary Examiner*—Joseph H. Feild
(74) *Attorney, Agent, or Firm*—Christensen O'Connor Johnson & Kindness PLLC

(57) ABSTRACT

A method, system and computer-readable medium for providing user-interfacing within textures of three-dimensional models. A processor with hardware and software components stores one or more markup documents with one or more user-interface element that may be a link element in one or more texture image files of predefined three-dimensional model(s). Then, the processor generates a three-dimensional model(s) for display on a display device based on predefined three-dimensional model information, predefined viewpoint information and the one or more markup documents stored in the one or more texture image files. Users can cause the processor to generate a new markup documents as texture by selecting a link element displayed within the three-dimensional model's texture.

24 Claims, 9 Drawing Sheets

OTHER PUBLICATIONS

Oliver, Dick, et al, Sams' Teach Yourself HTML 4 in 24 Hours, second edition, Sams.net Publishing, pp. 181–190, Dec. 1997.*

Parr, Terence J., et al, "A Language for Creating and Manipulating VRML", ACM 0-89791-818-5/95/12, 123–131, Dec. 1995.*

* cited by examiner

THREE-DIMENSIONAL MODELS WITH MARKUP DOCUMENTS AS TEXTURE

FIELD OF THE INVENTION

This invention relates to computer generated composite documents and, more particularly, to computer generated dynamic composite documents with three-dimensional models.

BACKGROUND OF THE INVENTION

The design of computer generated composite documents is continually changing to provide more interactive and dynamic features for increasing the ease of user interaction. Composite documents include components, such as images, text, and animations. Hyperlinks can be associated with any of the images, text, or animations. The components may be stored at different locations, such as on a host computer's hard drive, or at a server remotely located from the host computer, but accessible via an intra-network or the Internet. With respect to an intra-network or the Internet, composite documents are called Web pages.

Dynamic composite document features that are presently provided to users include manipulateable three-dimensional models. Virtual Reality Modeling Language (VRML) is an example of a programming language that can be used to provide manipulateable three-dimensional models, such as boxes, cylinders, cones and spheres, as well as several advanced shape geometries in composite documents. Three-dimensional geometries created from VRML can be manipulated in a composite document by a viewer. The viewer can rotate the models and perform other space transformation functions relative to the models. The surfaces of the created three-dimensional models are covered with a texture image which is a two-dimensional grid, like a piece of graph paper. Each grid square of the two-dimensional grid can be colored a different color. The grid squares of the texture image are called texture pixels or texels. The texels of a texture image are typically stored in an image file. The designer of a composite document can select an image file to use as a texture map with a Uniform Resource Locator (URL). Using a URL to specie a texture image file enables the designer to select texture images from anywhere. With respect to VRML, the texture image files can store a single texture image or a movie containing a series of texture images, like the frames in a film. Typically, JPEG (Joint Photographic Experts Group) and GIF (Graphics Interchange Format) file formats are used for non-movie texture images and the MPEG (Moving Pictures Experts Group) format is used for movie textures. A block with six sides may have a different image retrieved from a different URL for each side. See A. L. Ames et al., *VRML* 2.0 Source Book, 1997. Unfortunately VRML, and other three-dimensional modeling languages, do not support user-interface features, such as hyperlinking of information contained in the texture images applied to a three-dimensional shape. The present invention is directed to overcoming this deficiency.

SUMMARY OF THE INVENTION

In accordance with this invention, a method, system and computer-readable medium for providing hyperlinking within textures of three-dimensional models is provided. A processor with hardware and software components stores one or more markup documents in one or more texture image files of predefined three-dimensional models.

A markup document may include user-interface elements, such as various types of link elements. The processor generates a three-dimensional model for display on a display device based on predefined three-dimensional model information, predefined viewpoint information and the texture image files. The texture image files and, thus, the markup documents are mapped to predetermined locations on the predefined three-dimensional model. The displayed markup documents may include user-interface elements that may be hyperlinked to another document, file or script. As with user-interface elements included in two-dimensional markup documents, the user-interface elements included in the displayed three-dimensional model are selected by activating a cursor on the user-interface element, e.g., by placing a mouse controlled cursor over the user-interface element and activating the appropriate mouse button or tabbing from link to link with use of the keyboard In accordance with other aspects of the present invention, a markup document mapped to a three-dimensional model may be changed by the occurrence of an input event. The occurrence of the input event causes a new markup document to be rendered, stored in the related texture image file, and mapped to the related location on the three-dimensional model.

In accordance with further aspects of the present invention, the input event is placing a cursor on a user-interface element and activating the button of a mouse or other device that controls the position of the cursor. The location of the cursor when activation occurs is used to identify the markup document stored in the texture image file to be changed.

In accordance with still other aspects of the present invention, the input event is the replacement of one markup document stored in a texture image file with another markup document.

In accordance with yet other aspects of the present invention, the markup documents are HTML (Hypertext Markup Language) documents.

As will be readily appreciated from the foregoing summary, the invention provides a new and improved method, apparatus and computer-readable medium for incorporating hyperlinking within textures of three-dimensional models.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In accordance with the present invention, three-dimensional models with one or more markup documents stored in the texture image files mapped to predetermined locations on the three-dimensional models are created As a result, the markup documents are displayed when the three-dimensional model is displayed. A markup language instructs a printer or video display how to present a markup document using content and format information and how to index or link the contents of the markup document using linking information. In other words, the markup language may contain instructions that allow the displayed representation to be interactive, dynamic and/or self-modifying. The displayed markup documents may include user-interface elements, such as buttons, events, listboxes, dropdowns, scrollbars, layout, text, three-dimensional party controls (like plugins, ActiveX controls, Shockwave), images, animation, timer services, alignment, flow-control, scripting languages, and the like. The user-interface element may be a link element that is in the form of graphical images and/or text that are hyperlinked to another document, file or script. Thus, like user-interface elements included in two-dimensional markup documents, the user-interface elements included in the displayed three-dimensional model allow users to interact with the texture of the three-dimensional model. With link elements, jumps to another document, file or script, or to another document, file or script to be included on the texture of a displayed three-dimensional model are possible. As will be readily appreciated by those of ordinary skill in graphics, a texture image file constitutes a unit of information representing a rendered HTML document that is either located in memory or in a storage location on a disk.

Markup documents may also include embedded sound sources. When a three-dimensional model includes a markup document with an embedded sound source, a multimedia processor, such as DirectX, combines the sound generated by the sound source with the three-dimensional model. The sound is played back through a speaker system to convey where the corresponding markup document is located on the three-dimensional model.

Figure 1:
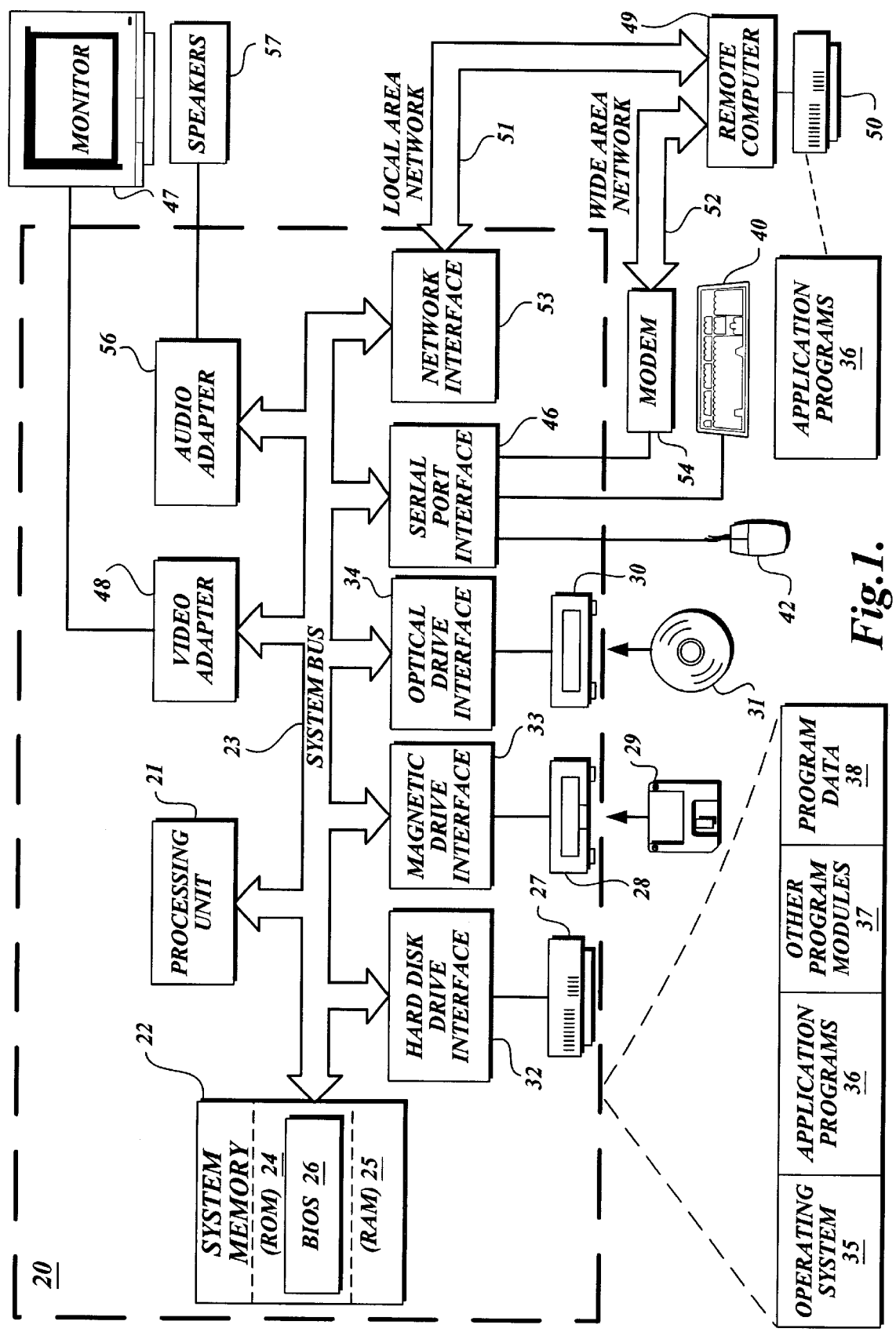
FIGS. 1 and 2 are block diagrams of general purpose computer systems for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus (USB). A display 47 is also connected to the system bus 23 via an interface, such as a video adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof, may be stored in the remote memory storage device. It will be appreciated that the network connections shown are exemplary, and other means of establishing a communications link between the computers may be used.

The present invention, implemented on a system of the type illustrated in FIG. 1 and described above, creates three-dimensional models that include markup documents with user-interface elements that may be linked to other documents, files or script similar to two-dimensional markup documents.

Figure 2:
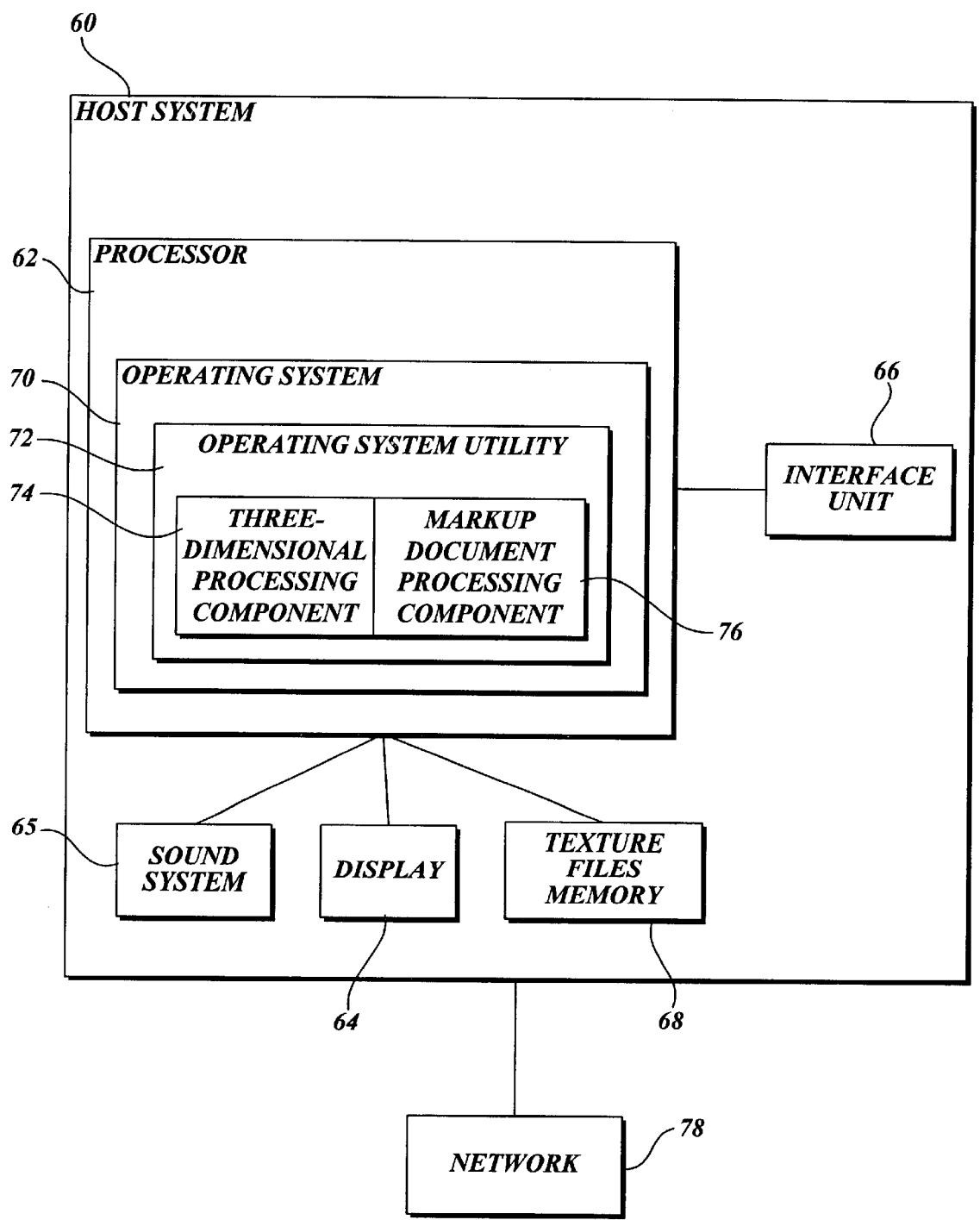

FIG. 2 illustrates the structural components, hardware and software components, included within a user's host system 60 that are required for performing the process of the present invention. The host system 60 includes a processor 62, a display 64, a sound system 65, an interface unit 66, and internal or external memory 68 for holding texture image files. The processor 62 is controlled by an operating system 70 that includes an operating system utility 72, such as a web browser. The operating system utility 72 includes a three-dimensional processing component 74 and a markup document processing component 76. The host system 60 is coupled to a network 78 for receiving information for display. Received information includes content, format and linking information that defines what information (content) is to be presented on the display 64 and through the sound system 65, how (format) the information is to be presented on the display 64 and through the sound system 65 and how user interactions will be processed (linking). As will be readily appreciated by those skilled in the computer art, the processing components described above may be distributed over a network.

The information received by the host system 60 from the network 78 is requested by the host system's user or automatically sent by a remote server coupled to the host system 60 via the network 78. The received information is analyzed by the operating system utility 72 and its components. If the operating system utility 72 determines that the received information includes one or more markup document that is to be displayed in a three-dimensional model(s), the markup document processing component 76 generates the markup documents and stores the generated markup documents in texture image files in the memory 68 that relate to the to be created three-dimensional model. Then, the three-dimensional processing component 74 renders the three-dimensional model(s) and maps the markup documents stored in the texture image files related to the rendered three-dimensional model(s). The format information provides the instructions for the storing of the markup documents in texture image files, the presenting of sound and the rendering of the three-dimensional model(s). If the received information directs display of two-dimensional non-markup document for display in a three-dimensional model, the operating system utility 72 performs display generation according to currently practiced techniques.

Figure 3:
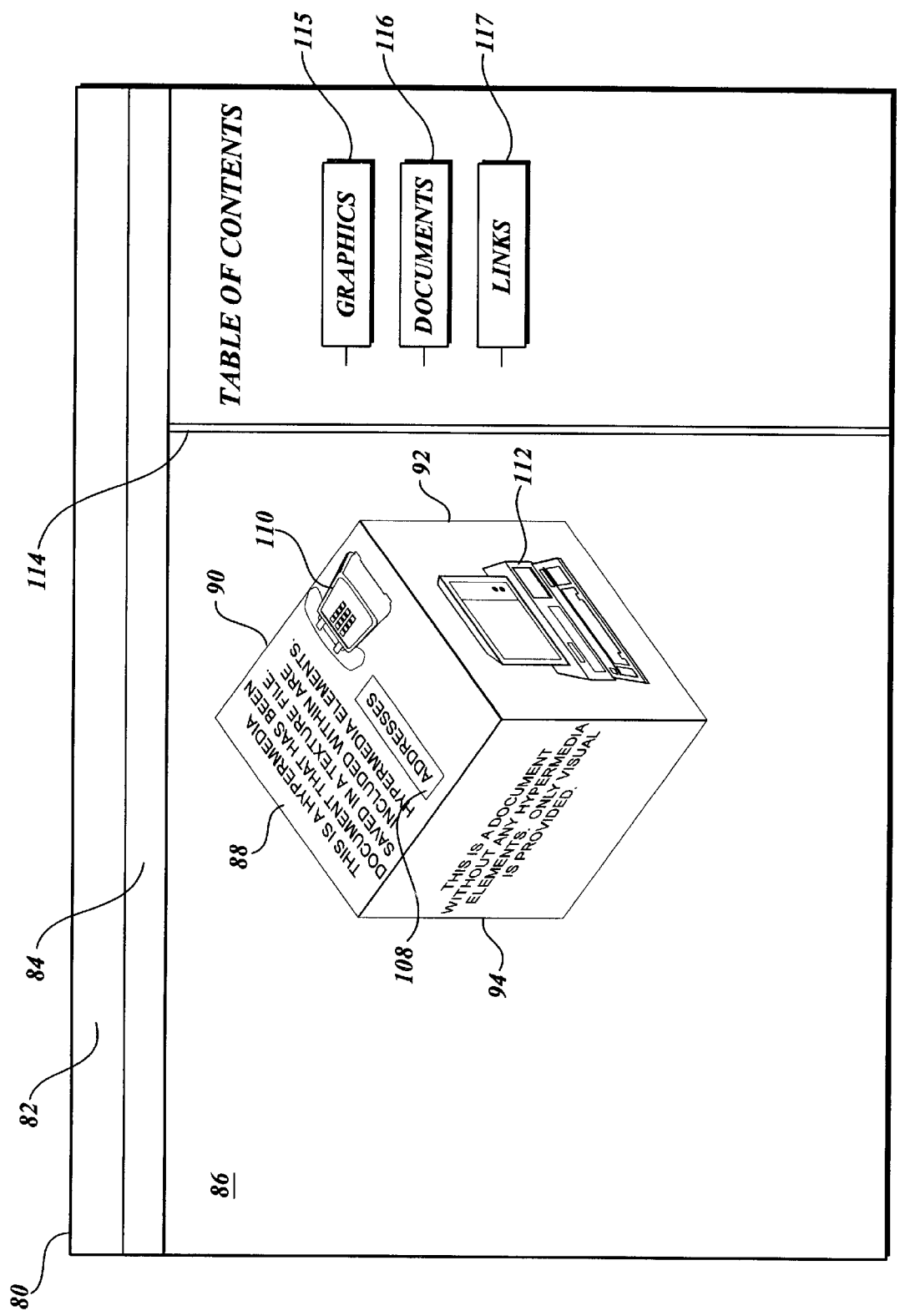
FIG. 3 is a screen shot of received information displayed as a three-dimensional model of a box with markup documents displayed as texture on the box.
Figure 4A:
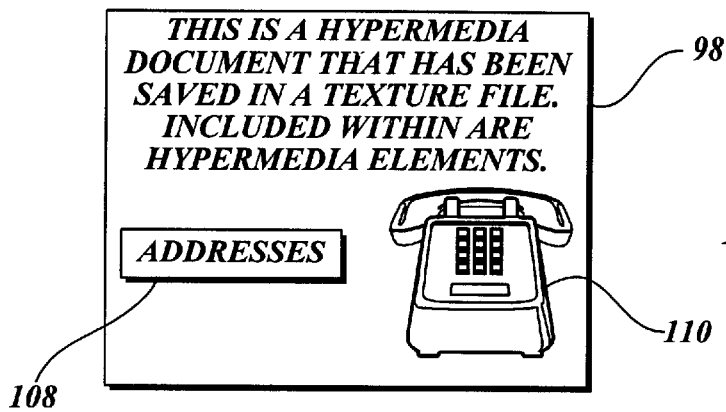
FIGS. 4A–C are the markup documents saved in texture image files associated with three-dimensional model of FIG. 3.
Figure 4B:
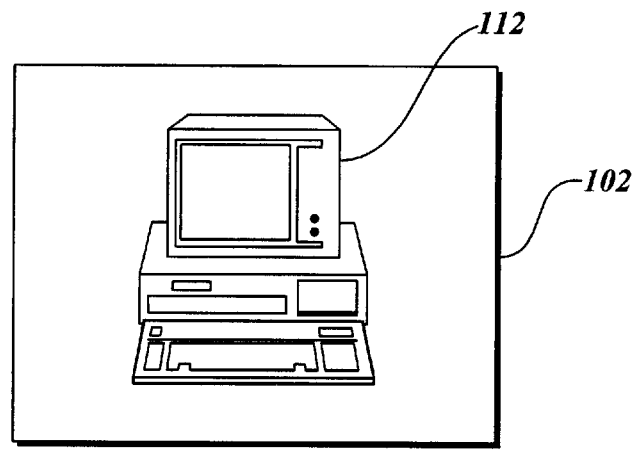
Figure 4C:
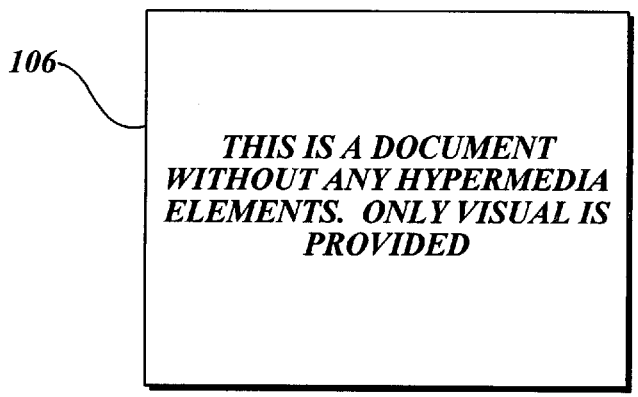

FIG. 3 is a screen shot of a window 80 generated by the operating system utility 72 according to received content, format and linking information. The window 80 includes a title bar 82, a menu, command or button bar 84, and a display area 86. The window 80 is generated by the operating system utility 72 for display on a desktop in a windows-based operating system. Within the display area 86 is a three-dimensional model 88 which is a box with six sides, three of which are visible 90, 92 and 94. The information stored in a texture image file is mapped to each side by the three-dimensional processing component 74. The texture image files mapped to visible sides 90 and 92 include a markup document with user-interface elements that are link elements. Before the three-dimensional processing component 74 renders any three-dimensional model(s) and maps the texture image files to the rendered model(s), the markup processing component 76 generates the markup documents included or identified in the received content information and stores the generated markup documents into texture image files according to the received format information. FIGS. 4A–C illustrate the markup documents stored in texture image files for the visible sides 90, 92 and 94. FIG. 4A is the markup document 98 that is stored in texture file that will be mapped to visible side 90, FIG. 4B is the markup document 102 that is stored in texture file that will be mapped to visible side 92 and FIG. 4C is the markup document 106 that is stored in texture file that will be mapped to visible side 94. The three non-visible sides of the box shaped three-dimensional model 88 also include mapped texture image files that have markup or non-markup documents stored in texture image files(not shown).

As with any two-dimensional markup document, either the entire document, or portions thereof, forms a user-interface element. The user-interface element may be a link element. If desired more than one user-interface element with more than one link element can be included in the markup document. Again for purposes of illustrating and describing the invention, the markup documents 98 and 102 stored in the texture image files mapped to the sides of the box shaped three-dimensional model 88 include at least one user-interface element that is a link element. Markup document 98 includes link elements 108 and 110. Link element 108 is a text user-interface element and link element 110 is an image user-interface element. The link element 112 included in markup document 102 is an image user-interface element that appears as a computer. Link elements 108, 110, and 112 are selectable by the user for retrieving information according to an address, i.e. a Uniform Resource Locator (URL), assigned to the link element. The linking information included in the retrieved information provides a linking action. The linking action may be that a markup document on a three-dimensional model is replaced partially or filly, or a two-dimensional markup document, such as frame 114 with link elements 115, 116 and 117 or the entire image within display area 86 is replaced with a two-dimensional markup document, a two-dimensional non-markup document, or a different three-dimensional model with mapped texture images. For example, link element 110 is linked via a URL to a document with phone numbers. When the user selects link element 110 on three-dimensional model 88, the phone number's document replaces markup document 98 within the texture image file based on the information retrieved using the phone number's document's URL. Then, the three-dimensional processing component is instructed to remap side 90 of three-dimensional model 88 with the phone numbers document that is stored in the texture image file.

Figure 5:
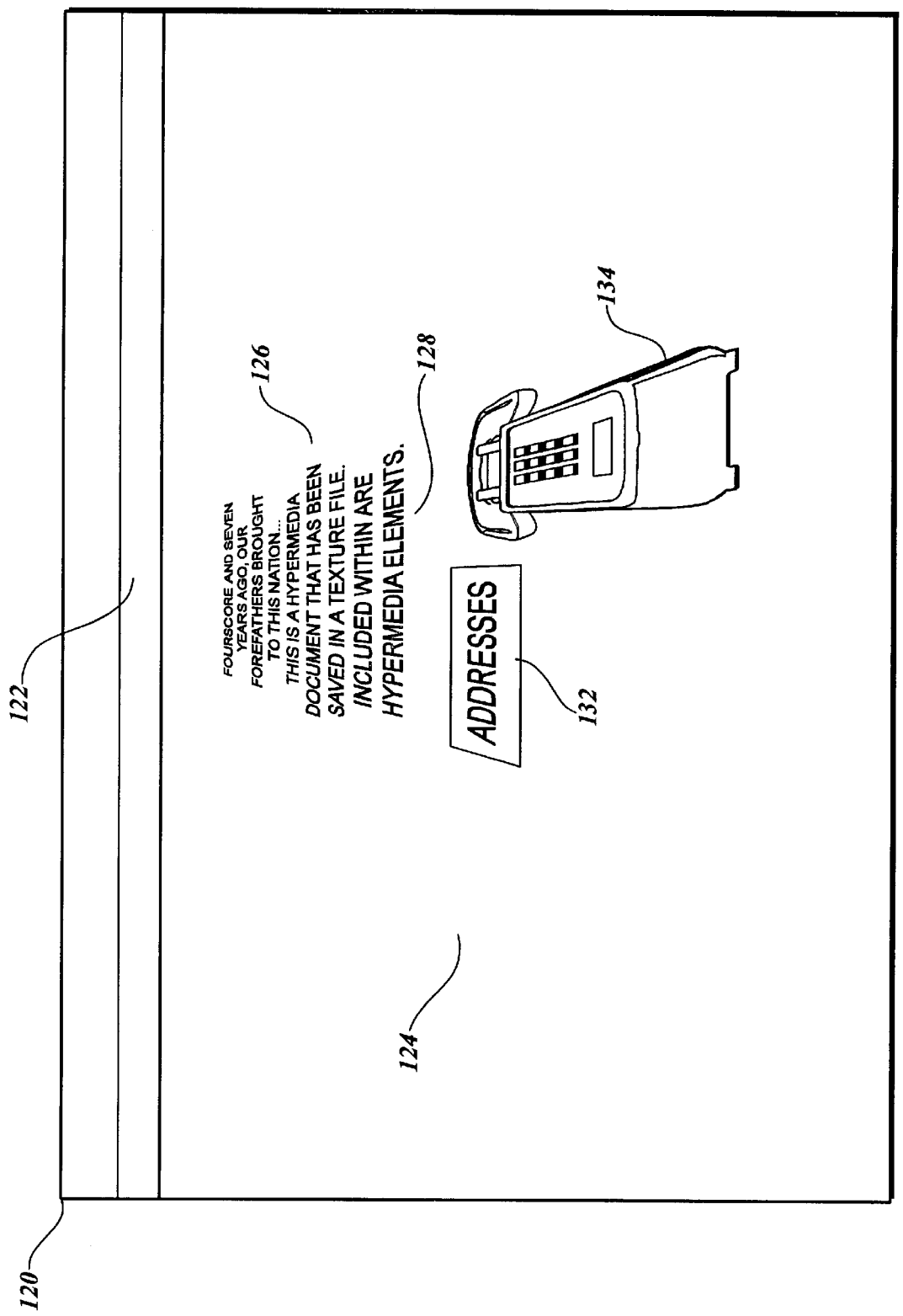
FIG. 5 is a screen shot of received information displayed as a three-dimensional model of a two-dimensional surface in three-dimensional space with a markup document displayed as the texture of the two-dimensional surface.

FIG. 5 is a screen shot of a window 120 that includes a menu, command or button bar 122, and a display area 124. Again, the window 120 is generated by the operating system utility 72 for display on a desktop in a windows-based operating system. Displayed within display area 124 is a three-dimensional model or surface 126 that appears to be a markup document 128 that begins at some distance from the camera's viewpoint and moves away from that viewpoint. Markup document 128 includes embedded sound information that, when presented through the sound system, sounds as if it were moving away from the viewer at the same rate the markup document 128 is moving away in the display area 124. As will be readily appreciated by those skilled in multimedia processing of sound in three dimensions, the sound presented through the sound system could be audibly apparent to move left or right, up or down, forward or backward, or any combination of movements depending upon the capabilities of the sound system.

Figure 6A:
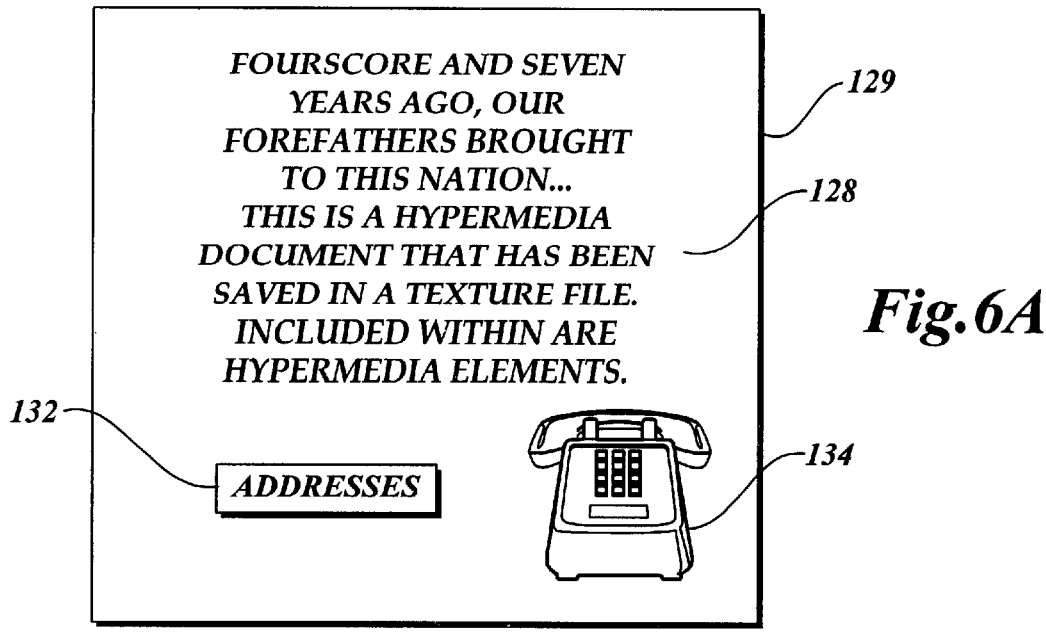
FIGS. 6A–B are the markup document saved in a texture image file associated with three-dimensional model of FIG. 5.
Figure 6B:
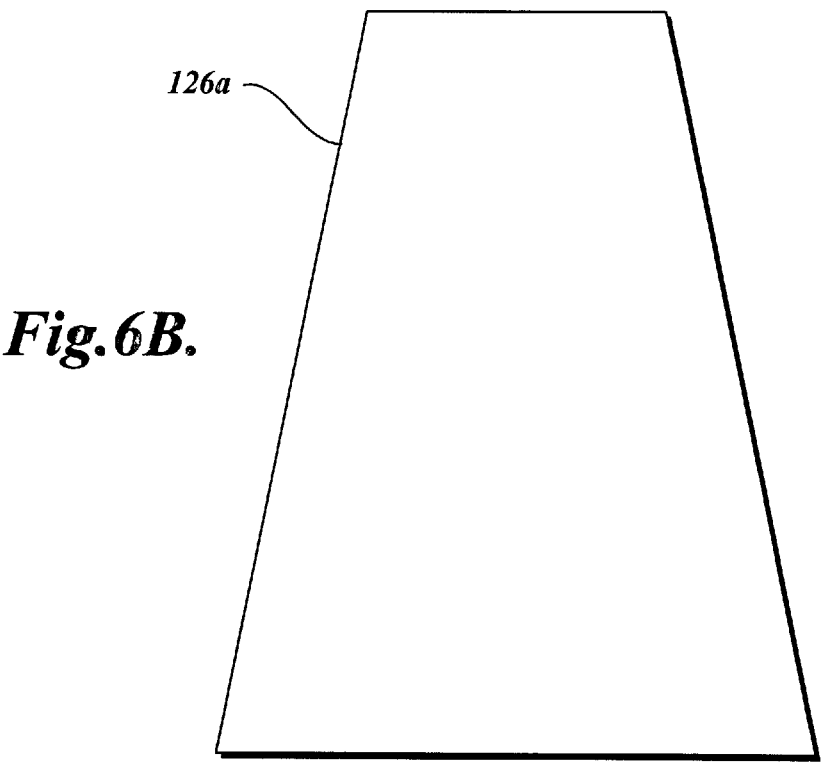

FIG. 6A is the markup document 128 stored in a texture image file 129 and FIG. 6B is the three-dimensional model or surface 126 before the texture image file 129 with the stored markup document 128 is mapped thereto. The three-dimensional model or surface 126 is generated by the three-dimensional processing component 74 according to the received format information. First, the markup document 128 is generated according to the received content information. Then, the generated markup document 128 is stored in the texture image file 129 according to the received format information. The three-dimensional processing component 74 generates the three-dimensional model 126 according to three-dimensional model information and three-dimensional viewpoint information included in the received content and format information. Then, the texture image file 129 is mapped to the three-dimensional model 126 and displayed as shown in FIG. 5. The markup document 128 includes link elements 132 and 134. The markup document may include other types of user-interface elements. The link elements 132 and 134 with assigned linking actions are selectable by a user from the displayed three-dimensional model 126. For the purpose of displaying the effects of disappearing text, the borders of the three-dimensional model 126 are not displayed.

In FIGS. 3 and 5, the user selects a link element by placing a cursor (not shown) over the link element and then activating the cursor. A mouse can be used to place the cursor on the displayed image. A link element may also be selected by tabbing to the element then activating the element by selecting the enter key on the keyboard.

Preferably, the box shaped three-dimensional model 88 can be made to appear to rotate bringing non-visible sides with previously mapped texture image files, that may include prestored markup or non-markup documents, into view. Model rotation may be automatic or may be activated by the user by operation of the interface unit 66 (FIG. 2), such as a mouse or touchpad. As the viewpoint changes or the three-dimensional model is moved, the markup documents displayed as texture on the three-dimensional models move in real-time with the models because the markup documents are stored in the model's texture image files.

In one embodiment of the present invention the three-dimensional model processing component is implemented in software, such as DirectX. The markup processing component is also implemented in software, such as a Hypertext Markup Language (HTML) renderer. As will be readily appreciated by those of ordinary skill in the art of markup documents, the markup documents may be rendered by the markup processing component from content information stored within the system memory 22, the hard disk drive 27, the magnetic disk drive 28, the optical disk drive 30, or on remote devices located on one of the networks 51 and 52 (FIG. 1).

Figure 7:
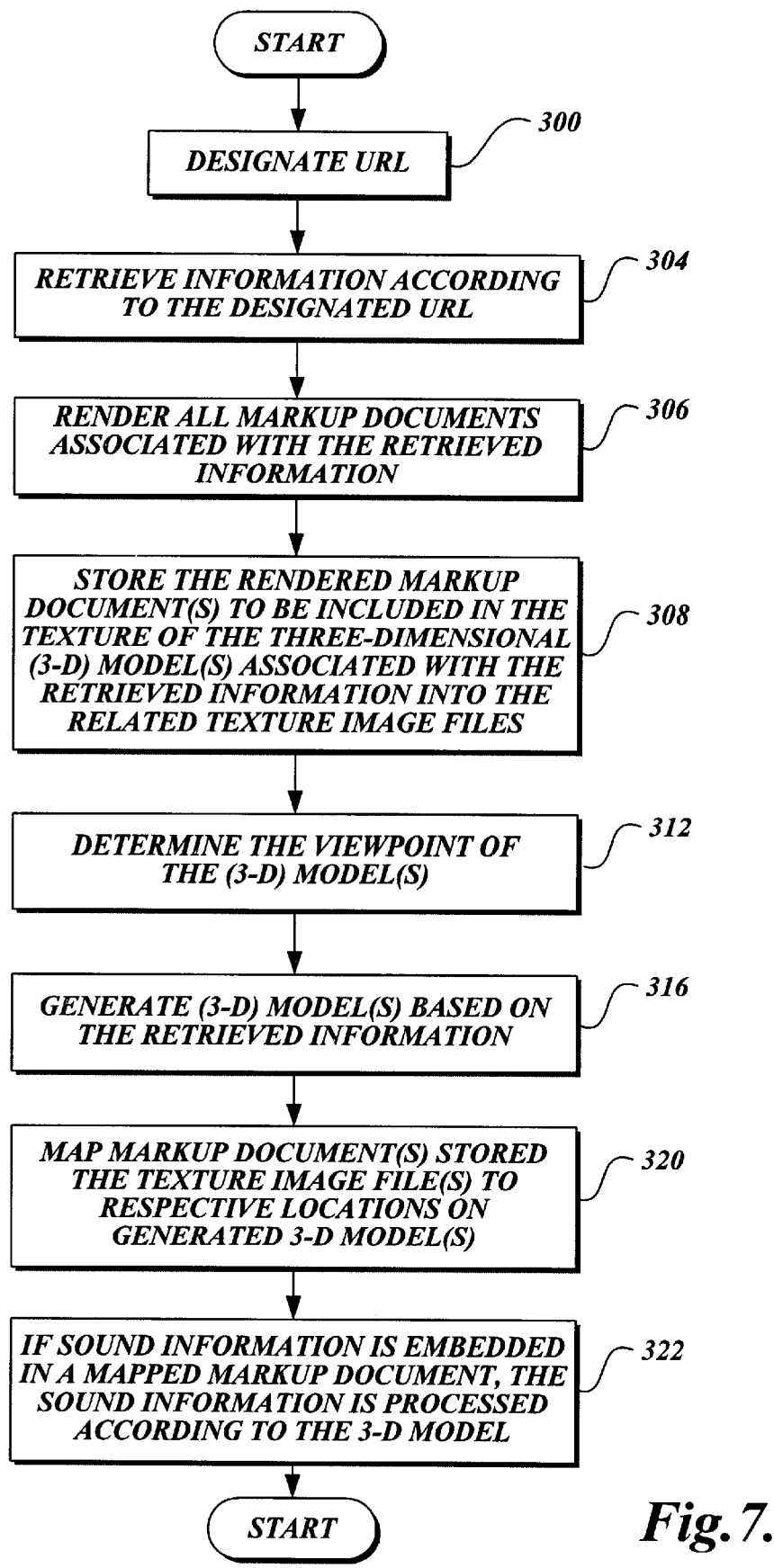
FIGS. 7–9 are flow diagrams illustrating the process of the invention for providing markup documents as texture on three-dimensional models.
Figure 8:
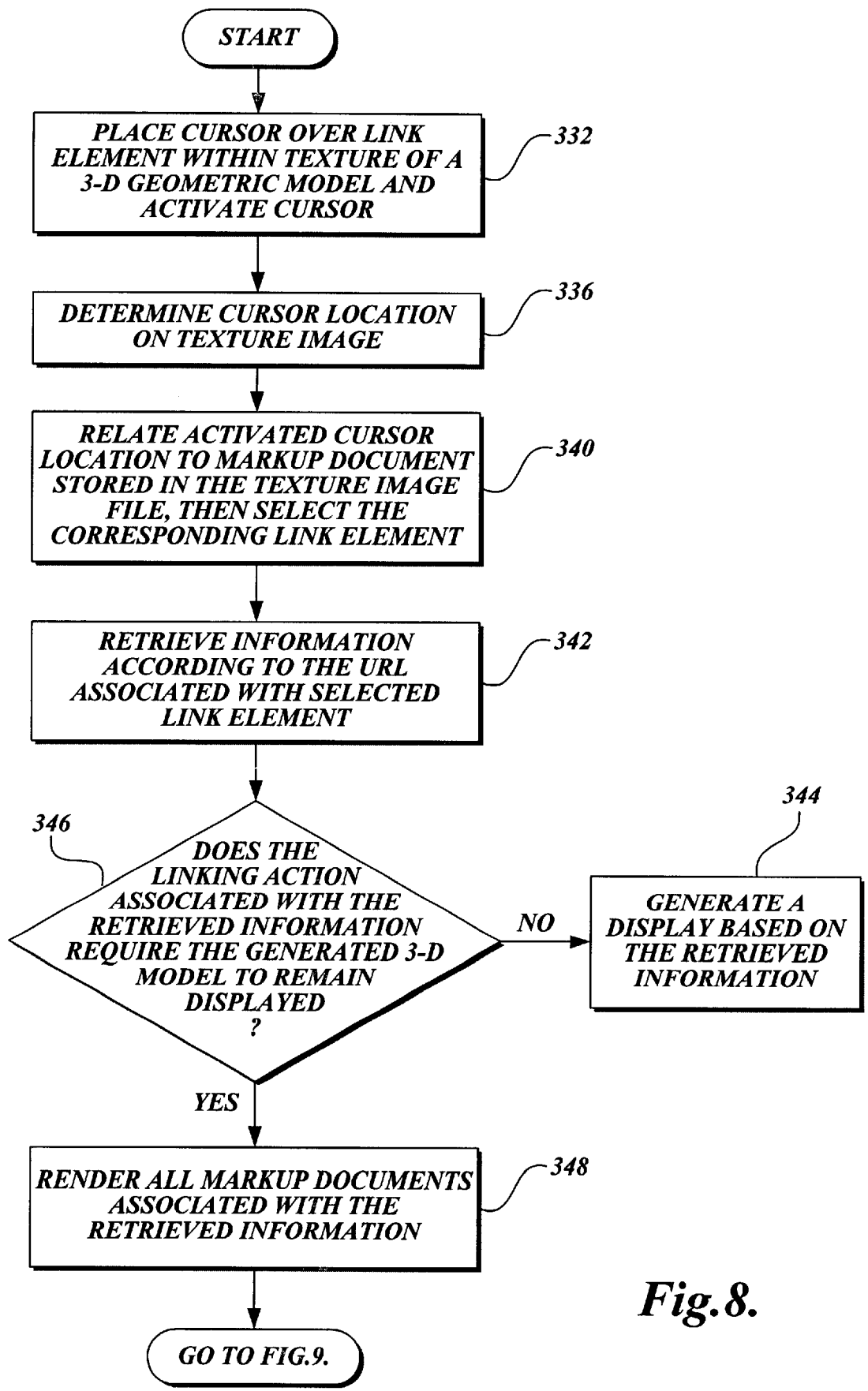
Figure 9:
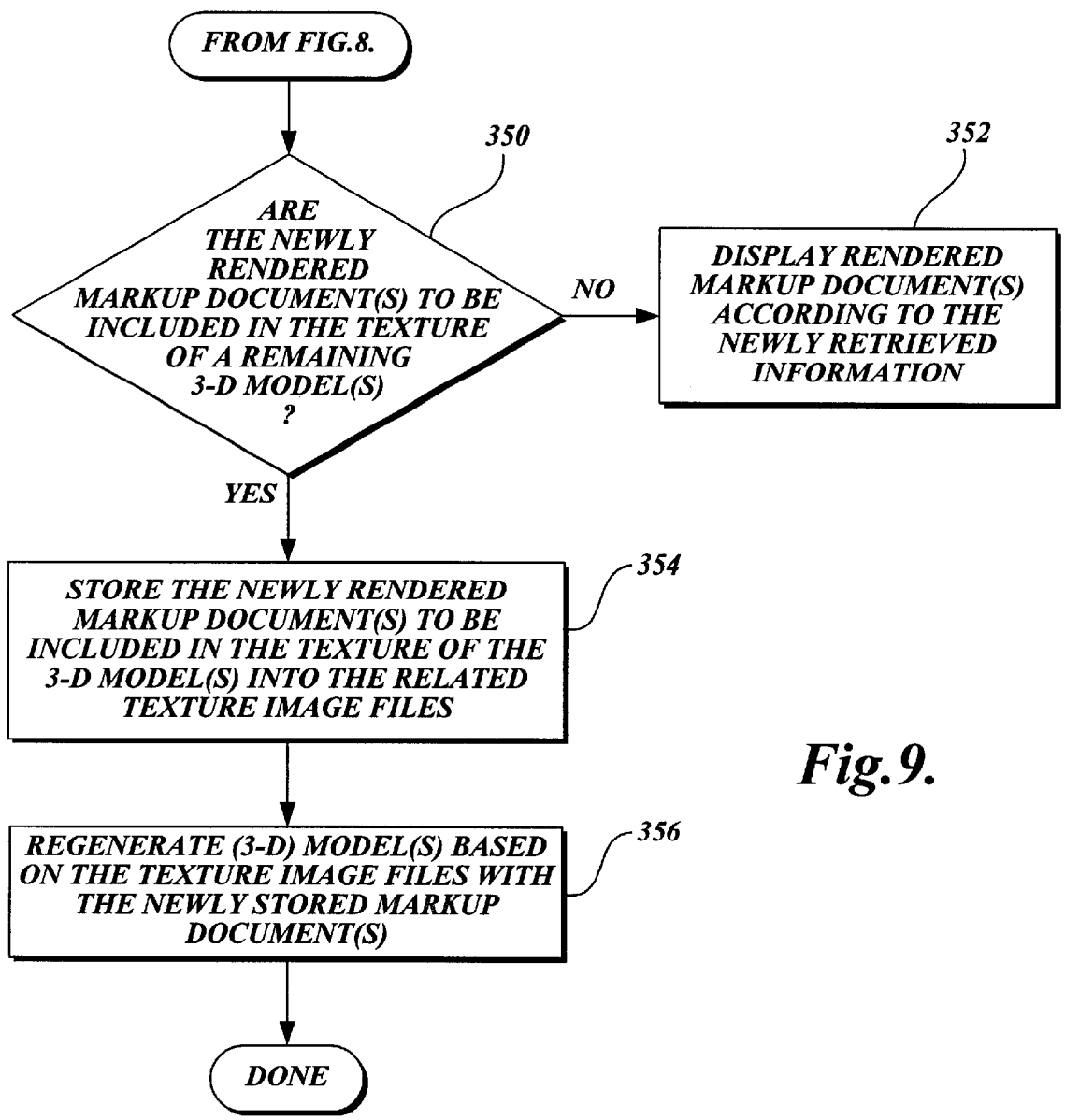

FIGS. 7–9 are flow diagrams of the process of the present invention for including markup documents in the textures of three-dimensional models. Referring to FIG. 7, first, at block 300, an address or URL is designated. A URL may be designated by entering the URL into a text line, or the URL may be accessed from a link element, included in another markup document, that was previously selected by a user. Next, at block 304, the information associated with the designated URL is retrieved. As described above, the retrieved information includes content, format and linking information. At block 306, all markup documents associated with the retrieved content information are rendered by the markup document processing component 76 within the operating system utility 72 (FIG. 2). Depending upon the received format information, the rendered markup document (s) could be designated as a two-dimensional document, or a texture on a three-dimensional model. The rendered markup document(s) that is to be displayed as a texture on a three-dimensional model(s) is stored in a texture image file for later mapping to the three-dimensional model(s) by the three-dimensional processing component 74 (FIG. 2). See block 308. A three-dimensional model may be a shape, such as a cone, cube or sphere, a planar surface that is defined in three-dimensional space, geometries that are authored through a three-dimensional authoring tool, or geometries that are generated by predefined algorithms. At block 312, the viewpoint of the three-dimensional model is determined. The three-dimensional model(s) and the three-dimensional model's(s') viewpoint are determined by the three-dimensional processing component 74 according to the received content and format information. The determined viewpoint is initially a default viewpoint, and if the three-dimensional model can be manipulated, the user can change the viewpoint using the interface unit. Then, at block 316, the three-dimensional model(s) is generated by the three-dimensional processing component 74 based on the retrieved content and format information. The markup documents stored in the texture image files are then mapped by the three-dimensional processing component to the respective locations on the generated three-dimensional model(s). See block 320. At block 322, if sound information is embedded in a markup document mapped to a three-dimensional model, the sound information is processed according to the three-dimensional model.

The markup document can be stored in a texture image file in various ways. One method of storing a markup document is to scale up or down the markup document to fit in the texture image file. Another method of storing a markup document is to insert a scroll bar into the texture image file, if the markup document is a great deal bigger in size than the texture image file. When a user manipulates a scroll bar displayed with a markup document on a three-dimensional model, the three-dimensional processing component is directed to map the markup document according to the scrolling action.

A user can interact with the link elements or other user-interface elements in markup documents displayed on a three-dimensional model texture in the same way a user interacts with them in two-dimensional markup documents. The user uses a mouse or other cursor control device to place a cursor on a link element and activates the cursor control device. The cursor control device activation selects the link element which causes the operating system utility 72 to retrieve information according to an address preassigned to the link element. The retrieved information includes linking information that includes a predesignated link mode or action. The following are example linking actions: 1. go to new markup document; 2. change the texture where the selected link element appears; and 3. change another portion of the presently displayed markup document or image. As will be readily appreciated by those of ordinary skill in the art of hyperlinking, if none of the above actions are identified for the user selected link element, no linking action occurs when that link element is selected. Also, it will be appreciated that any present linking action technique may be assigned to a link element. In accordance with the present invention, the processor or three-dimensional processing component first determines the cursor activation position with respect to the selected link element and then provides that determination to the markup processing component, which responds according to one of the above described linking actions.

Turning to FIG. 8, at block 332, the user places the cursor over or highlights a link element within the texture of the displayed three-dimensional model and then activates the cursor or the highlighted area. A selection signal is sent to the three-dimensional processing component 74 which determines where in the texture image the selection took place. See block 336. The following describes one technique to determine the selected texture location. A graph of the displayed scene or image includes a list of all of the three-dimensional models and their current positions. When the cursor control device is activated a position on the display is determined. This technique then determines the precise intersection point of the determined position on the display and the graph of the displayed scene or image by first generating a ray that begins at the projection or camera point of the displayed scene or image. Then, the intersections of the generated ray with all of the objects in the scene are determined. The closest intersection to the projection plane, but not between the projection plane and the projection or camera point, is selected. The intersection information includes the three-dimensional coordinate of the intersection. The intersection's three-dimensional coordinate is interpolated with respect to a geometric pattern, such as triangles, on the texture with vertices defined in three-dimensions to determine the UV texture coordinate.

After the cursor location in the text image is determined, at block 340, the link or user-interface element within the markup document stored in the texture image file is identified based on the determined selected texture coordinate location (i.e., UV texture coordinate) and selected by a mouse or user-interface message created when the cursor or the highlighted area was activated.

At block 342, the operating system utility retrieves information according to the URL assigned to the selected link element or performs the action assigned to the selected user-interface element. At decision block 346, if the linking action associated with the retrieved information is determined to require replacement of the present display, at block 344, the operating system utility generates a display based on the retrieved information. The retrieved information requires the operating system utility to generate either a two-dimensional markup or non-markup document, or a different three-dimensional model with markup document(s) as texture (i.e., return to start of FIG. 7).

If the linking action associated with the retrieved information is determined to require the generated three-dimensional model to remain displayed, the markup or non-markup document(s) associated with the retrieved information is rendered by the operating system utility. See block 348. Next, at decision block 350 in FIG. 9, the operating system utility determines if the newly rendered markup or non-markup documents are to be included in the texture of a presently displayed three-dimensional model(s). If the newly rendered markup or non-markup document(s) is not to be included on a presently displayed three-dimensional model(s), at block 352, the newly rendered markup or non-markup documents are displayed based on the format information in the retrieved information. If the newly rendered markup or non-markup document(s) is to be included on a presently displayed three-dimensional model(s), the newly rendered markup or non-markup document(s) is stored in the three-dimensional model's related texture image files. See block 354. At block 356, the three-dimensional processing component in the operating system utility remaps the affected texture using the newly stored document(s).

Also, a change can occur internally to the HTML document on a three-dimensional model, for example, some timer event fires inside the document and the document decides that it has changed. If the internal change occurs, the HTML renderer notifies the three-dimensional processing component that something has changed. Then, the three-dimensional processing component redraws as much of the scene as necessary. The present invention provides user-interface elements, such as link elements, within three-dimensional models. Because the present invention uses markup documents, such as HTML documents, to accomplish user-interfacing within the three-dimensional models, the storage space required for the textures is much less than the previously stored types of texture images. The memory space savings using HTML is on the order of 2 or 3:1. The amount of data needed to represent HTML is less than an equivalent JPEG. This reduces the amount of network or disk access time needed to transfer the corresponding data to the host computer. Also, because markup documents, such as HTML documents, can be generated at rates of 10 to 15 frames per second or more, real-time manipulation of a generated three-dimensional model is easily accomplished. For example, when the viewpoint of a three-dimensional model with markup documents as texture is changed, the texture images are regenerated for the three-dimensional model in real-time.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for providing user-interface features within textures of three-dimensional models, said method comprising:

(a) storing one or more markup documents in a texture image file, each of said markup documents containing at least one embedded link;

(b) generating a three-dimensional model based on pre-defined three-dimensional model information, viewpoint information and the one or more markup documents stored in the texture image file such that the at least one embedded link contained in each of said markup documents is displayed at a predetermined location on said three-dimensional model;

(c) receiving an input, if the input comprises a selection of an embedded link displayed in the texture:

(i) identifying the texture location where the selection occurred;

(ii) determining the embedded link contained within the markup document stored in the texture image file based on the identified texture location; and (iii) generating an event based on the determined embedded link; and (d) changing the texture of the three-dimensional model based on the generated event.

2. The method of claim 1, wherein receiving an input is an automatic reception of image information to replace a presently displayed texture.

3. The method of claim 1, wherein the markup document is an HTML document.

4. A method for providing user-interface features within textures of three-dimensional models, said method comprising:
   (a) storing one or more markup documents in a texture image file, each of said markup documents containing at least one embedded link;
   (b) generating a three-dimensional model based on predefined three-dimensional model information, viewpoint information and the one or more markup documents stored in the texture image file such that the at least one embedded link contained in each of said markup documents is displayed at a predetermined location on said three-dimensional model;
   (c) receiving an input; and
   (d) changing the texture of the three-dimensional model based on the input comprising:
      (i) rendering a new markup document based on the input;
      (ii) storing the newly rendered markup document within the predefined texture image file; and
      (iii) mapping the newly stored markup document stored in the texture image file to the respective location on the three-dimensional model.

5. The method of claim 4, wherein the markup document is an HTML document.

6. A system for providing user-interface features within textures of three-dimensional models, said system comprising:
   (a) a display device;
   (b) a memory;
   (c) a processor with hardware and software components for:
      (i) storing in memory one or more markup documents, each of said markup documents containing at least one link embedded in a texture image file; and
      (ii) generating a three-dimensional model for display on the display device based on predefined three-dimensional model information and predefined viewpoint information and the one or more markup documents containing at least one link embedded in a texture image file such that a link element associated with each of said embedded links is displayed at a predetermined location on said three-dimensional model;
   (d) a receiving component for receiving an input comprising:
      (i) a user interface for selecting a link element displayed in the texture;
      (ii) a location identifier component for identifying the texture location where the selection occurred;
      (iii) a link element determining component for determining the embedded link contained within the markup document stored in the texture image file based on the identified texture location; and
      (iv) an event generating component for generating an event based on the determined embedded link; and
   (e) a changing component for changing the texture of the three-dimensional model based on the generated event.

7. The system of claim 6, wherein the receiving component automatically receives image information to replace a presently displayed texture.

8. The system of claim 6, wherein the markup document is an HTML document.

9. A system for providing user-interface features within textures of three-dimensional models, said system comprising:
   (a) a display device;
   (b) a memory;
   (c) a processor with hardware and software components for:
      (i) storing in memory one or more markup documents, each of said markup documents containing at least one link embedded in a texture image file; and
      (ii) generating a three-dimensional model for display on the display device based on predefined three-dimensional model information and predefined viewpoint information and the one or more markup documents containing at least one link embedded in a texture image file such that a link element associated with each of said embedded links is displayed at a predetermined location on said three-dimensional model;
   (d) a receiving component for receiving an input; and
   (e) a changing component for changing the texture of the three-dimensional model based on the input comprising:
      (i) a rendering component for rendering a new markup document based on the input;
      (ii) a storing component for storing the newly rendered markup document within the respective texture image file; and
      (iii) a mapping component for mapping the newly rendered markup document stored in the texture image file to the respective location on the three-dimensional model.

10. The system of claim 9, wherein the markup document is an HTML document.

11. A computer-readable medium with executable instructions for providing user-interface features within textures of three-dimensional models, said instructions comprising:
    (a) a first component for storing one or more markup documents, each of said markup documents containing at least one link embedded in a texture image file;
    (b) a second component for generating a three-dimensional model for display based on predefined three-dimensional model information and predefined viewpoint information stored in the memory and the one or more markup documents containing at least one link embedded in a texture image file such that each of the at least one embedded links is displayed at a predetermined location on said three-dimensional model;
    (c) a third component for receiving an input comprising:
       (i) a user interface component for activating an embedded link displayed in the texture;
       (ii) a location identifier component for identifying the texture location where the activation occurred;
       (iii) an element determining component for determining the embedded link contained within the markup document stored in the texture image file based on the identified activated texture location; and
       (iv) an event generating component for generating an event based on the determined embedded link; and
    (d) a changing component for changing the texture of the three-dimensional model based on the generated event.

12. The computer-readable medium of claim 11, wherein the receiving component automatically receives image information to replace a presently displayed texture.

13. The computer-readable medium of claim 11, wherein the markup document is an HTML document.

14. A computer-readable medium with executable instructions for providing user-interface features within textures of three-dimensional models, said instructions comprising:
(a) a first component for storing one or more markup documents, each of said markup documents containing at least one link embedded in a texture image file;
(b) a second component for generating a three-dimensional model for display based on predefined three-dimensional model information and predefined viewpoint information stored in the memory and the one or more markup documents containing at least one link embedded in a texture image file such that each of the at least one embedded links is displayed at a predetermined location on said three-dimensional model;
(c) a third component for receiving an input; and
(d) a fourth component for changing the texture of the three-dimensional model based on the input comprising:
(i) a rendering component for rendering a new markup document based on the input;
(ii) a storing component for storing the newly rendered markup document within the respective texture image file; and
(iii) a mapping component for mapping the newly rendered markup document stored in the texture image file to the respective location on the three-dimensional model.

15. The computer-readable medium of claim 14, wherein the markup document is an HTML document.

16. A method for providing user-interface features within textures of three-dimensional models, said method comprising:
(a) storing one or more markup documents in a texture image file, each of said markup documents containing at least one embedded link;
(b) generating a three-dimensional model based on predefined three-dimensional model information, viewpoint information and the one or more markup documents stored in the texture image file such that the at least one embedded link contained in each of said markup documents is displayed at a predetermined location on said three-dimensional model; and
(c) in response to an input indicating the selection of an embedded link displayed at a predetermined location on said three-dimensional model:
(i) identifying the texture location where the selection occurred;
(ii) determining the embedded link contained within the markup document stored in the texture image file based on the identified texture location; and
(iii) generating an event based on the determined embedded link.

17. The method of claim 16, wherein changing the texture comprises:
rendering a new markup document based on the generated event;
storing the newly rendered markup document within the predefined texture image file; and
mapping the newly stored markup document stored in the texture image file to the respective location on the three-dimensional model.

18. The method of claim 16, wherein the markup document is an HTML document.

19. A system for providing user-interface features within textures of three-dimensional models, said system comprising:
(a) a display device;
(b) a memory;
(c) a processor with hardware and software components for:
(i) storing in memory one or more markup documents, each of said markup documents containing at least one link embedded in a texture image file; and
(ii) generating a three-dimensional model for display on the display device based on predefined three-dimensional model information and predefined viewpoint information and the one or more markup documents containing at least one link embedded in a texture image file such that a link element associated with each of said embedded links is displayed at a predetermined location on said three-dimensional model; and
(d) a receiving component for receiving an input, said receiving component comprising:
(i) a user-interface for selecting one of said embedded links displayed at predetermined locations on said three-dimensional model;
(ii) a location identifier for determining the texture location where the selection occurred;
(iii) a link element determining component for determining the link embedded in a texture image file contained within the markup document on the identified texture location; and
(iv) an event generating component for generating an event based on the determined embedded link.

20. The system of claim 19, including a changing component comprising:
a rendering component for rendering a new markup document based on the generated event;
a storing component for storing the newly rendered markup document within the respective texture image file; and
a mapping component for mapping the newly rendered markup document stored in the texture image file to the respective location on the three-dimensional model.

21. The method of claim 19, wherein the markup document is an HTML document.

22. A computer-readable medium with executable instructions for providing user-interface features within textures of three-dimensional models, said instructions comprising:
(a) a first component for storing one or more markup documents each of said markup documents containing at least one link embedded in a texture image file;
(b) a second component for generating a three-dimensional model for display based on predefined three-dimensional model information and predefined viewpoint information stored in the memory and the one or more markup documents containing at least one link embedded in a texture image file such that each of the at least one embedded links is displayed at a predetermined location on said three-dimensional model; and
(c) a third component for receiving an input, said receiving component comprising:
(i) a user interface component for activating a link displayed at a predetermined location on said three-dimensional model;
(ii) a location identifier component for determining the texture location where the activation occurred;

(iii) an element determining component for determining the link embedded within the texture image file contained in a markup document based on the identified activated texture location; and (iv) an event generating component for generating an event based on the determined embedded link.

23. The computer-readable medium of claim 22, including a changing component comprising:

a rendering component for rendering a new markup document based on the generated event;

a storing component for storing the newly rendered markup document within the respective texture image file; and a mapping component for mapping the new rendered markup document.

24. The computer-readable medium of claim 22, wherein the markup document is an HTML document.

* * * * *

UNITED STATES PATENT AND TRADEMARK OFFICE
CERTIFICATE OF CORRECTION

PATENT NO.     : 6,363,404 B1
DATED          : March 26, 2002
INVENTOR(S)    : K.K. Dalal et al.

It is certified that error appears in the above-identified patent and that said Letters Patent is hereby corrected as shown below:

Title page,
Item [74], *Attorney, Agent, or Firm*, "Johnson & Kindness" should read -- Johnson Kindness --
Item [57], ABSTRACT,
Line 5, "user-interface element" should read -- user-interface elements --
Line 13, "documents" should read -- document --

Column 1,
Line 42, "specie" should read -- specify --

Column 2,
Line 15, "keyboard" should read -- keyboard. --
Lines 56 and 63, "with three-dimensional" should read -- with a three-dimensional --

Column 3,
Line 6, "created As" should read -- created. As --

Column 4,
Line 8, "that helps" should read -- that help --

Column 5,
Line 45, "ment" should read -- ments --
Line 50, "to be created" should read -- to-be-created --
Line 59, "document for display" should read -- documents for display --

Column 6,
Line 3, "visible" should read -- visible, --
Line 25, "files(not" should read -- files (not --
Line 29, "If desired" should read -- If desired, --
Line 46, "filly," should read -- fully, --
Line 55, "number's" should read -- numbers --

Column 7,
Line 41, "element then" should read -- element and then --

Column 8,
Lines 13-14, "document
             (s)" should read -- document(s) --

UNITED STATES PATENT AND TRADEMARK OFFICE
CERTIFICATE OF CORRECTION

PATENT NO. : 6,363,404 B1
DATED : March 26, 2002
INVENTOR(S) : K.K. Dalal et al.

It is certified that error appears in the above-identified patent and that said Letters Patent is hereby corrected as shown below:

Column 9,
Line 24, "activated a" should read -- activated, a --

Column 10,
Line 26, "the previously stored" should read -- that required by the previously stored --

Column 14,
Line 50, "documents each" should read -- documents, each --

Column 16,
Line 5, "new rendered" should read -- newly rendered --

Signed and Sealed this

Twenty-fifth Day of March, 2003

JAMES E. ROGAN
*Director of the United States Patent and Trademark Office*